(12) United States Patent
Lundin

(10) Patent No.: US 7,740,265 B2
(45) Date of Patent: Jun. 22, 2010

(54) SEMI TRACTOR DOLLY ASSEMBLY

(75) Inventor: Richard E. Lundin, Park Ridge, IL (US)

(73) Assignee: Lundin Recovery Equipment LLC, Park Ridge, IL (US)

( * ) Notice: Subject to any disclaimer, the term of this patent is extended or adjusted under 35 U.S.C. 154(b) by 0 days.

(21) Appl. No.: 12/166,710

(22) Filed: Jul. 2, 2008

(65) Prior Publication Data

US 2010/0001489 A1 Jan. 7, 2010

(51) Int. Cl.
*B62D 53/08* (2006.01)

(52) U.S. Cl. .................... 280/476.1; 280/402; 280/767; 414/477; 414/475

(58) Field of Classification Search ............... 280/476.1, 280/475, 438.1, 425.1, 441, 478.1, 479.1, 280/481, 402, 767, 441.2; 414/477, 475
See application file for complete search history.

(56) References Cited

U.S. PATENT DOCUMENTS

| | | | |
|---|---|---|---|
| 4,555,214 A | 11/1985 | Morton | |
| 4,599,968 A | 7/1986 | Ryder et al. | |
| 4,708,358 A | 11/1987 | Gehman et al. | |
| 4,759,563 A | * | 7/1988 | Nash ........................ 280/476.1 |
| 4,768,802 A | 9/1988 | Winkler | |

(Continued)

FOREIGN PATENT DOCUMENTS

GB 1563796 4/1980

OTHER PUBLICATIONS http://www.citationce.com/airlift.htm.

(Continued)

*Primary Examiner*—Kevin Hurley
*Assistant Examiner*—Tashiana Adams
(74) *Attorney, Agent, or Firm*—John S. Pangiaguas; Katten Muchin Rosenman LLP

(57) ABSTRACT

A tractor dolly assembly is disclosed for use with a semi tractor or other vehicle to be towed in either a forward or reverse direction. The tractor dolly assembly is configured to be coupled to the rear frame of a semi tractor or other vehicle and lift the rear wheels off the ground for towing. In a forward tow direction, a conventional tow truck with a hydraulically operated boom for lifting the front of the semi tractor off the ground. In a reverse direction, virtually any truck with a pintle or other means for connection to a tow bar can be used for towing the disabled vehicle. In accordance with an important aspect of the invention, the tractor dolly assembly is provided with self steering wheels which allow the disabled vehicle to be towed in a reverse tow direction. The tractor dolly assembly is configured so that in a reverse tow direction, the semi tractor can be towed by any truck with a pintle hook, which are fairly common on semi tractors and other over the road vehicles or other means for connection to a tow bar. The pintle hook would be connected to a draw or tow bar, which, in turn, would be connected to the tractor dolly assembly on accordance with the present invention. In accordance with another important feature of the invention, since the tractor dolly assembly is configured to be secured to the frame of a disabled vehicle, use of the tractor dolly assembly is independent of the configuration of the tractor or other vehicle or whether the disabled vehicle has a fifth wheel assembly.

7 Claims, 6 Drawing Sheets

U.S. PATENT DOCUMENTS

| | | | |
|---|---|---|---|
| 4,861,221 A | | 8/1989 | Krisa |
| 5,370,414 A | * | 12/1994 | Tucker .................. 280/404 |
| 5,660,518 A | | 8/1997 | Meier |
| 5,722,677 A | | 3/1998 | Lichter et al. |
| 5,727,920 A | | 3/1998 | Hull et al. |
| 5,785,341 A | * | 7/1998 | Fenton .................. 280/441 |
| 5,839,876 A | | 11/1998 | McCarthy et al. |
| 5,845,920 A | | 12/1998 | Hill |
| 5,863,059 A | | 1/1999 | Waggoner |
| 6,036,217 A | * | 3/2000 | Burkhart et al. .......... 280/476.1 |
| 6,120,051 A | | 9/2000 | Lichter et al. |
| 6,170,849 B1 | * | 1/2001 | McCall .................. 280/433 |
| 6,290,248 B1 | * | 9/2001 | Yrigoyen ................ 280/476.1 |
| 6,450,523 B1 | * | 9/2002 | Masters et al. ............ 280/426 |
| 6,491,490 B1 | | 12/2002 | Trobee |
| 6,663,131 B2 | * | 12/2003 | Evans .................... 280/476.1 |
| 6,820,887 B1 | * | 11/2004 | Riggle ................... 280/476.1 |
| 6,843,487 B1 | | 1/2005 | Lotman |
| 6,929,249 B1 | | 8/2005 | Kim |
| 7,017,934 B2 | * | 3/2006 | Harris ................... 280/476.1 |
| 7,100,933 B2 | | 9/2006 | Zackovich et al. |
| 7,275,345 B2 | | 10/2007 | Cosse, III et al. |
| 7,275,753 B1 | | 10/2007 | Ceccarelli et al. |
| 7,497,457 B2 | * | 3/2009 | Jamieson ................. 280/460.1 |
| 2003/0132604 A1 | * | 7/2003 | Evans .................... 280/438.1 |
| 2004/0021290 A1 | * | 2/2004 | Hicks et al. .............. 280/438.1 |
| 2005/0161903 A1 | * | 7/2005 | Harris ................... 280/476.1 |
| 2007/0035103 A1 | | 2/2007 | Anton |

OTHER PUBLICATIONS

U.S. Appl. No. 11/958,950, filed Dec. 18, 2007, Richard E. Lundin.

* cited by examiner

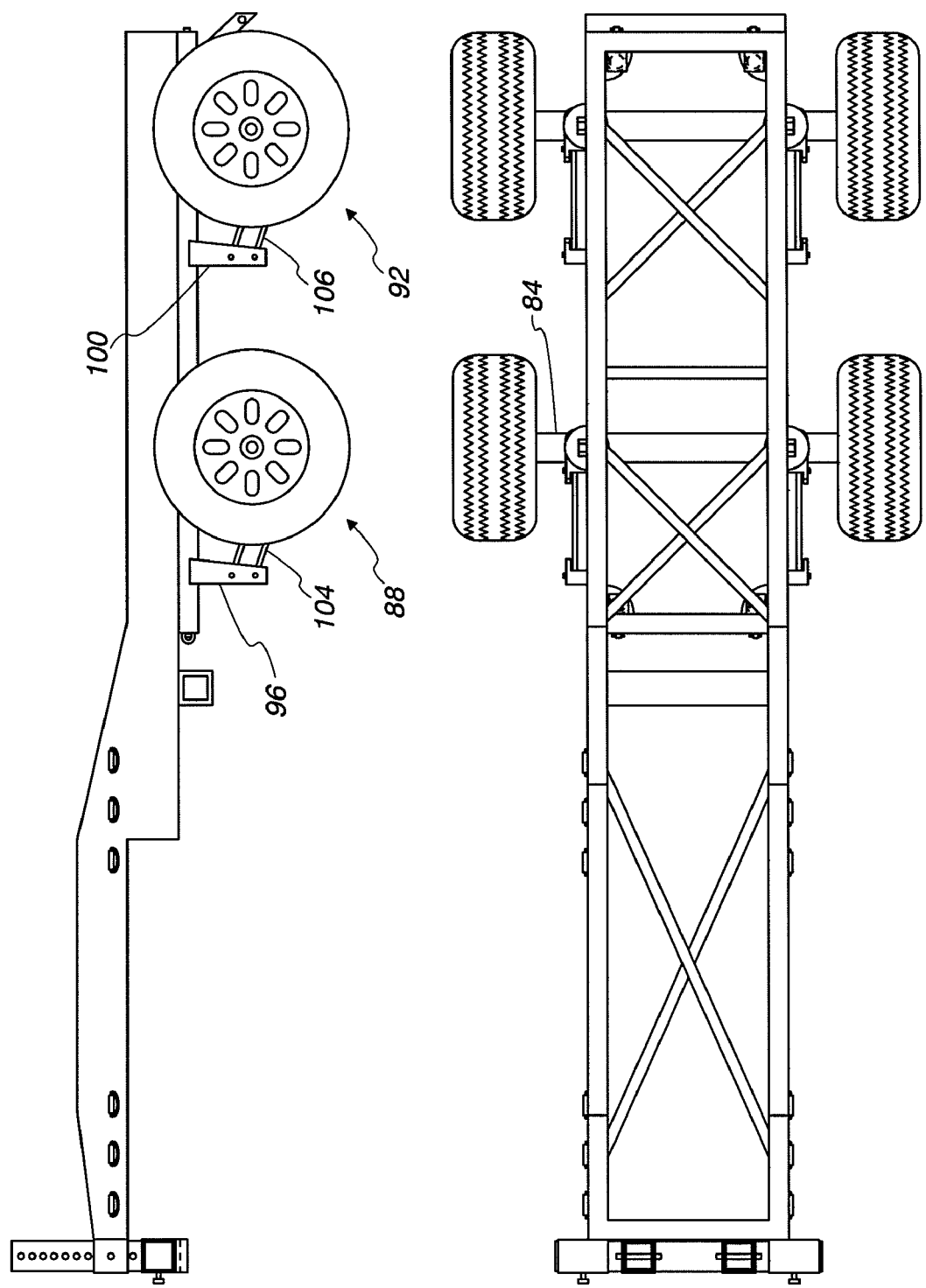

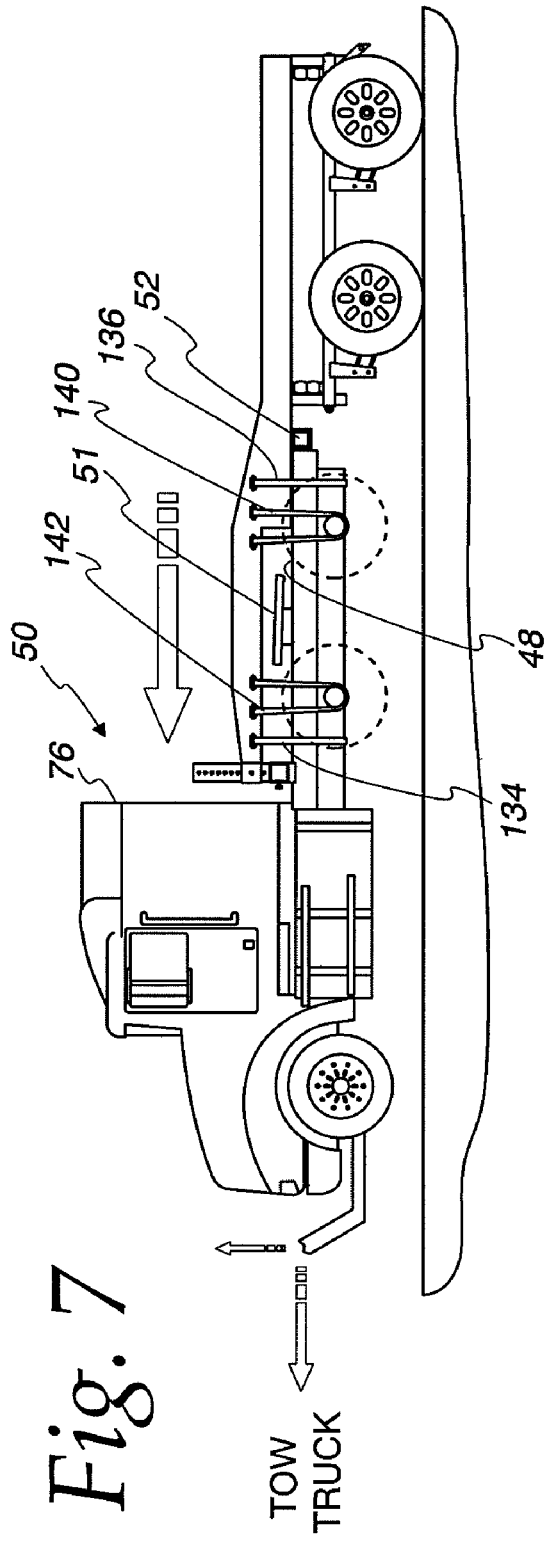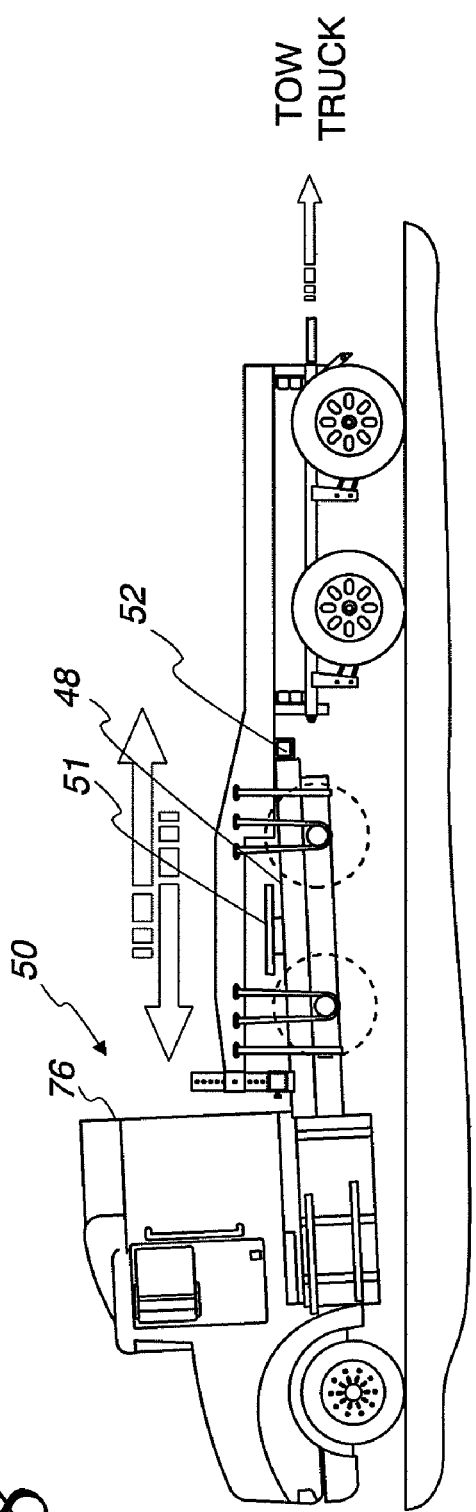

SEMI TRACTOR DOLLY ASSEMBLY

BACKGROUND OF THE INVENTION

1. Field of the Invention

The present invention relates to a tractor dolly assembly for use with a semi-tractor that is disabled that enables the tractor to be towed in a forward or reverse direction without the need to disconnect the drive shaft.

2. Description of the Prior Art

Various situations are known in which semi-trailers can not be transported in a normal fashion. For example, in situations in which the semi-trailer becomes structurally compromised due to a load shift or accident, semi-trailer dollies are known for supporting the trailer and enabling the semi-tractor to tow the disabled trailer to another location away from the location of the incident. An example of a semi-trailer tractor dolly assembly for use in such an application is disclosed in Lundin U.S. patent application Ser. No. 11/958,950, filed on Dec. 17, 2007, entitled Semi-Trailer Tractor dolly assembly, hereby incorporated by reference.

In yet other situations, the tractor itself becomes disabled either due to an accident or due to due to mechanical problems. In such a situation, the tractor is normally disconnected from the trailer and the trailer is transported to an alternate location by another tractor. The disabled tractor is then towed to an alternate location for repair by a tow truck Examples of devices for towing semi-tractors are disclosed in U.S. Pat. Nos. 4,555,214; 4,708,358; 4,861,221; 5,722,677; 5,845,920; 5,863,059; 6,120,051; 6,491,490; 7,017,934; and 7,100,933, all hereby incorporated by reference.

U.S. Pat. Nos. 4,555,214; 4,708,538; 5,722,677; 5,845,920; 5,863,059; 6,120,051; and 6,491,490 all disclose devices which are configured to be coupled to the fifth wheel assembly of the towing vehicle and the fifth wheel assembly of the towed vehicle As such, any available tractor with a fifth wheel assembly can be used as a tow vehicle, thus obviating the need for a dedicated tow truck, use of these devices requires the disabled tractors to be towed in reverse. Because the tractor is being towed in reverse, the drive shaft will rotate as the rear wheels of the towed tractor rotate during the tow. More particularly, either the drive shaft will have to be disconnected before the tow and reconnected after the tow, or the rear wheels will need to be lifted during the tow. Disconnecting and reconnecting the drive shaft is a rather cumbersome task. As such, the devices disclosed in U.S. Pat. Nos. 4,555,214; 4,708,358; 5,722,677; 5,845,920; 5,863,059; 6,120,051; 6,491,490; 7,017,934; and 7,100,933 are all configured to tow the towed vehicle with the rear wheels lifted from the ground. Although the devices disclosed in the above mentioned patents are suitable for towing tractors with fifth wheel assemblies, those devices are generally unsuitable for towing large trucks which do not include fifth wheel assemblies, such as, dump trucks and other large trucks. In order to resolve this problem, U.S. Pat. No. 5,722,677 discloses a towing device that can be coupled to a fifth wheel assembly on a tractor or alternatively coupled to the frame of a truck by way U-bolts.

The devices disclosed in the aforementioned patents all relate to mechanical devices that are not free standing devices As such, those devices must be manually lifted in place and connected to the two tractors. Such devices are thus relatively cumbersome to use.

U.S. Pat. Nos. 4,861,221; 7,017,934; and 7,100,933 all disclose free standing towing devices. In particular, U.S. Pat. Nos. 4,861,221 and 7,100,933 disclose wheeled devices that are adapted to be coupled to a fifth wheel assembly of tractor to be used as a towing vehicle. These devices include a hydraulically operated boom for lifting the front or rear of a vehicle. Based upon the configurations of these devices, they would only be suitable for lifting the front end of a semi tractor. As such, use of such a device to tow a semi tractor would require the drive shaft to be disconnected to avoid damage to the transmission.

U.S. Pat. No. 7,017,934 discloses a wheeled device for use in towing disabled semi tractors. In particular, the device disclosed in the '934 patent discloses a wheeled tractor dolly assembly for lifting the rear end of a semi tractor. A tow truck with a conventional tow bar is used to lift the front end of the tractor for towing. The wheeled tractor dolly assembly is coupled to the fifth wheel assembly of the disabled tractor and is therefore only suitable for use with semi tractors which have a fifth wheel assembly. Use of such a tractor dolly assembly only allows the tractor to be towed in a forward direction and is thus relatively limited in its application. Moreover, the tractor dolly assembly disclosed in the '934 patent is dependent on the configuration of the tractor, which vary. For example, some tractors have twin rear axles while others have a single rear axle. Also, the wheel base and location of the fifth wheel assembly is known to vary among tractors.

Thus, there is a need for a device for a device for use in towing large trucks including semi tractors which may not include a fifth wheel assembly that allows the large trucks to be towed in both a forward and reverse direction without the need to disconnect the drive shaft.

SUMMARY OF THE INVENTION

Briefly, the present invention relates to a tractor dolly assembly for a semi tractor or other vehicle to be towed in either a forward or reverse direction. The tractor tractor dolly assembly is configured to be coupled to the rear frame of a semi tractor or other vehicle and lift the rear wheels off the ground for towing. In a forward tow direction, a conventional tow truck with a hydraulically operated boom for lifting the front of the semi tractor off the ground. In accordance with an important aspect of the invention, the tractor tractor dolly assembly is provided with self steering wheels which allow the disabled vehicle to be towed in a reverse tow direction. The tractor dolly assembly is configured so that in a reverse tow direction, the semi tractor can be towed by any truck with a pintle hook or other means for connection to a tow bar, which are fairly common on semi tractors and other over the road vehicles. The pintle hook would be connected to a draw or tow bar, which, in turn, would be connected to the tractor dolly assembly on accordance with the present invention. In accordance with another important feature of the invention, since the tractor dolly assembly is configured to be secured to the frame of a disabled vehicle, use of the tractor dolly assembly is independent of the configuration of the tractor or other vehicle or whether the disabled vehicle has a fifth wheel assembly.

DESCRIPTION OF THE DRAWINGS

These and other advantages of the present invention will be readily understood with reference to the following specification and attached drawing wherein:

FIG. 2 is a front elevational view of the tractor dolly assembly illustrated in FIG. 1.

FIG. 3 is a top plan view of the tractor dolly assembly illustrated in FIG. 1.

FIG. 7 is a side elevational view illustrating an application of the tractor dolly assembly illustrated in FIG. 1 in a forward tow direction.

FIG. 8 is a side elevational view illustrating an application of the tractor dolly assembly illustrated in FIG. 1 in a reverse tow direction.

DETAILED DESCRIPTION

The present invention relates to a dolly assembly for a semi tractor or other vehicle to be towed in either a forward or reverse direction hereinafter referred to as a "tractor dolly assembly". The tractor dolly assembly is configured to be coupled to the rear frame of a semi tractor or other vehicle and lift the rear wheels off the ground for towing. In a forward tow direction, a conventional tow truck with a hydraulically operated boom for lifting the front of the semi tractor off the ground. In accordance with an important aspect of the invention, the tractor dolly assembly is provided with self steering wheels which allow the disabled vehicle to be towed in a reverse tow direction. The tractor dolly assembly is further configured so that in a reverse tow direction, the semi tractor can be towed by any truck with a pintle hook or other means for connection to a tow bar, which are fairly common on semi tractors and other over the road vehicles. The pintle hook would be connected to a draw or tow bar, which, in turn, would be connected to the tractor dolly assembly on accordance with the present invention. Since the tractor dolly assembly is configured to be secured to the frame of a disabled vehicle, use of the tractor dolly assembly is independent of the configuration of the tractor or other vehicle or whether the disabled vehicle has a fifth wheel assembly.

Figure 1:
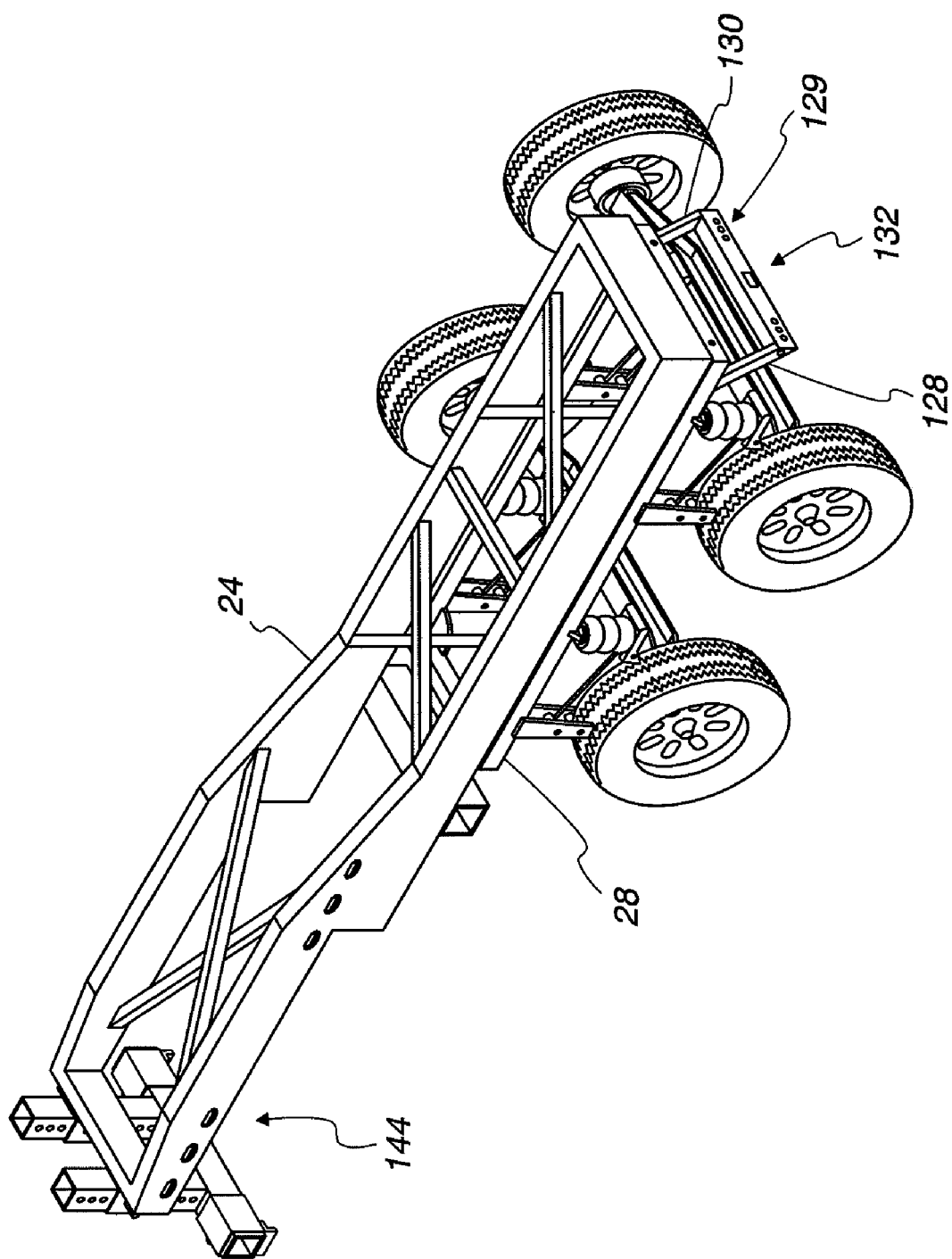
FIG. 1 is an isometric view of a tractor dolly assembly for use with towing a semi tractor or other vehicle in accordance with the present invention.
Figure 4:
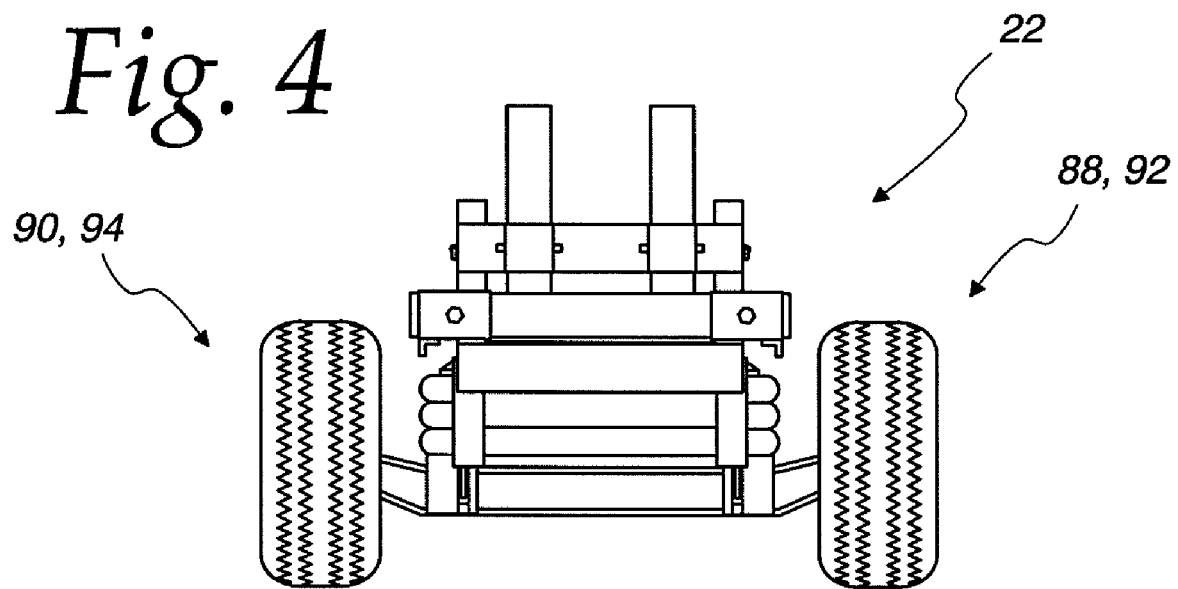
FIG. 4 is an elevational view of the left side of the tractor dolly assembly illustrated in FIG. 1.
Figure 5:
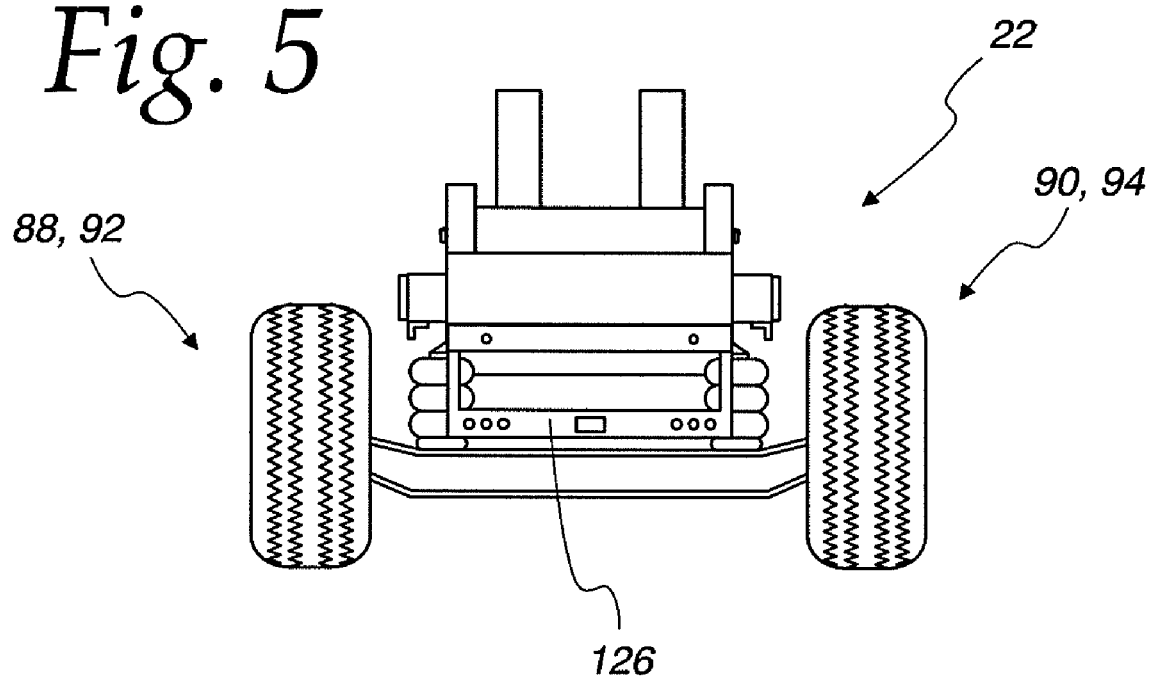
FIG. 5 is an elevational view of the right side of the tractor dolly assembly illustrated in FIG. 1.
Figure 6:
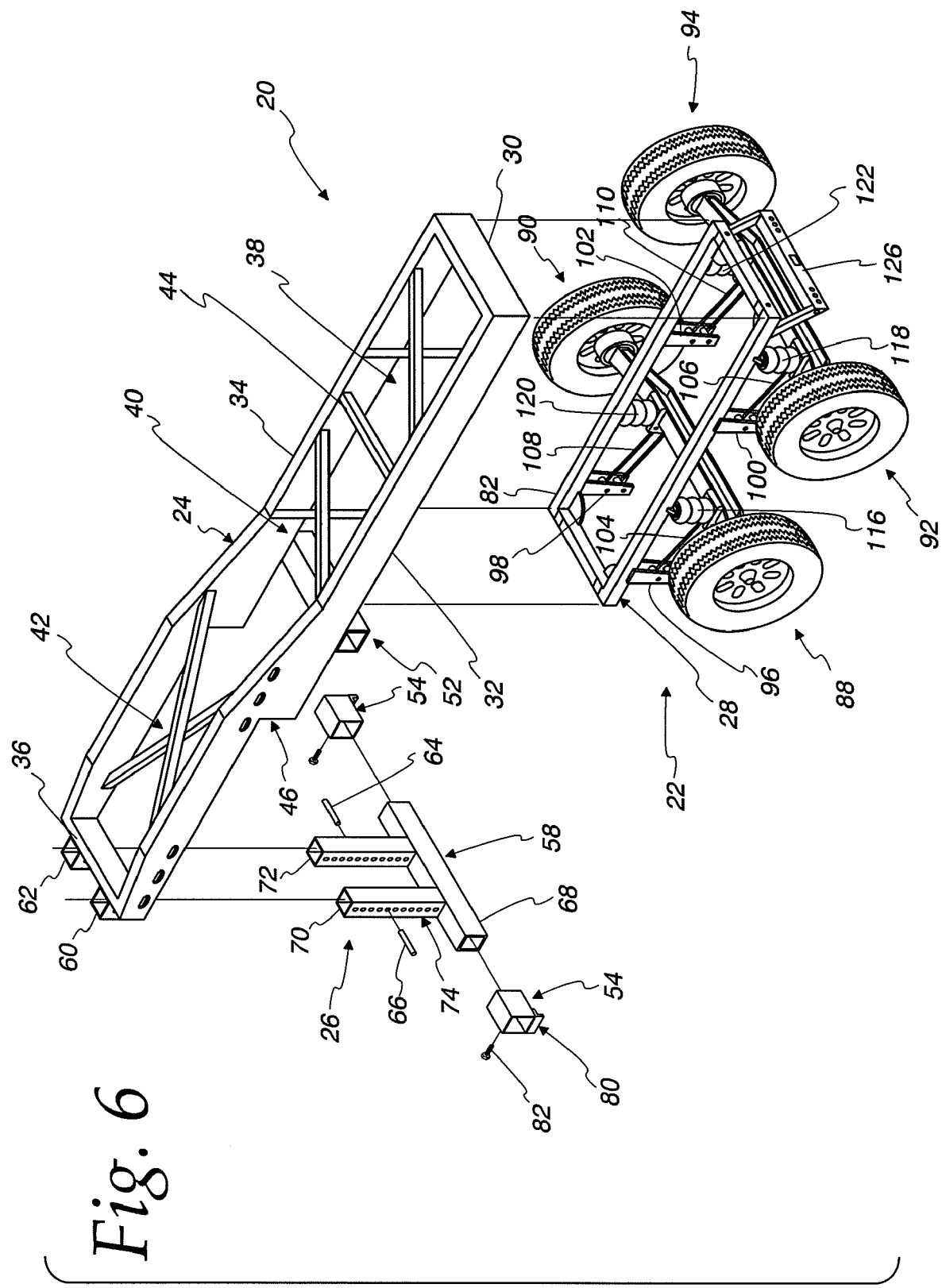
FIG. 6 is an exploded isometric view of the tractor dolly assembly illustrated in FIG. 1.

Referring to FIGS. 1-6, a tractor dolly assembly in accordance with the present invention is illustrated and generally identified with the reference numeral 20 (FIG. 6). The tractor dolly assembly 20 includes a wheeled cart assembly 22, a chassis assembly 24 and a stand-off assembly 26. The chassis assembly 24 is an elongated mechanical structure that is rigidly attached on one end to the wheeled cart assembly 22, for example, by welding or fasteners (not shown). It is also contemplated that the chassis assembly 24 can be integrally formed with a frame member 28 that forms part of the wheeled cart assembly 22. As best shown in FIGS. 1 and 2, the chassis assembly 24 is aligned with a rear portion of the frame member 28.

The chassis assembly 24 is formed in a generally rectangular shape having a pair of spaced apart side portions 32 and 34 (FIG. 6) and front and rear portions 36 and 30, respectively, joined together forming a generally rectangular frame. The distance between the side portions 32 and 34 may be selected to coincide with the width of the frame of the wheeled cart assembly 22. Cross braces, generally identified with the reference numerals 38, 40 and 42 may be rigidly secured to the interior of the side portions 32 and 34 of the chassis assembly 24, for example, by welding, for support. One or more straight braces 44 may also be rigidly connected between the side portions 32 and 34 of the chassis assembly 24, for example, by welding, for support.

In accordance with an important aspect of the invention, the tractor dolly assembly 20 is configured to be attached directly to the frame of a semi tractor as well as other types of vehicles that do not have a fifth wheel assembly. As such, as best shown in FIGS. 1, 2 and 6, the side potions 32 and 34 of the chassis assembly 24 are formed to have a step configuration in order to provide clearance of the fifth wheel assembly when the tractor dolly assembly is being used for towing a vehicle having such a fifth wheel assembly, such as a semi tractor, as shown in FIGS. 7 and 8. More particularly since a part of the side portions 32 and 34 of the chassis assembly 24 is intended to rest on the frame 48 (FIGS. 7 and 8) of the tractor 50 (FIGS. 7 and 8), a step, generally identified with the reference numeral 46 (FIG. 6), is formed in both of the side portions 32 and 34 of the chassis assembly 24. The height of the step 46 is selected to clear the fifth wheel assembly 51, as best shown in FIGS. 7 and 8. As such, the tractor dolly assembly 20 is configured to tow vehicles with and without a fifth wheel assembly.

A stop 52 (FIG. 6) may be rigidly attached to the underside of the chassis assembly 24. The stop 52 is used to position the tractor dolly assembly 20 with respect to the vehicle and to maintain the position of the tractor dolly assembly 20 with respect to the vehicle during towing. As best shown in FIGS. 7 and 8, the stop 52 rests against the rear portion of the vehicle frame 48. The stop 52 may be formed from a hollow tube, for example, a rectangular tube, and welded to the side portions 32 and 34 of the chassis assembly 24 at a distance selected to allow the chassis assembly 24 to extend to a position in front of the fifth wheel assembly 51.

The stand-off assembly 26 (FIG. 6) allows the height of the chassis assembly 24 to be varied relative to the vehicle frame 48 (FIGS. 7 and 8). The stand-off assembly 26 also includes adjustable shoes 54 that allow the tractor dolly assembly 20 to accommodate vehicle frames having different widths. More particularly, the stand-off assembly 26 includes a T-bar assembly 58, a pair of spaced apart sleeves 60 and 62 and a pair of pins 64 and 66. The T-bar assembly 58 may be formed from a horizontal tube 68 and two spaced apart vertical tubes 70 and 72. The vertical tubes 70 and 72 include a plurality of aligned and spaced apart apertures, generally identified with the reference numeral 74. The apertures 74 are configured to receive the pins 64 and 66.

As shown, the T-bar assembly 26 is formed with a horizontal tube 68 and vertical tubes 70 and 72 formed with rectangular cross sections. These members 68, 70 and 72 may be formed with other cross sections, such as circular and rectangular cross sections. For strength, these members 68, 70 and 72 may be formed as solid bars or alternatively as hollow tubes.

As mentioned above, a pair of spaced apart sleeves 60 and 62 is rigidly attached to a front portion 36 of the chassis assembly 24, as shown in FIG. 6. The cross sectional area of the sleeves 60 and 62 is selected to receive the vertical tubes 70 and 72 which form a portion of the T-bar assembly 58. The sleeves 70 and 72 are rigidly attached to a front portion 36 of the chassis assembly 24, for example, by welding.

In operation, the vertical tubes 70 and 72 are slidably received in the sleeves 60 and 62, respectively, and positioned to the desired height. The pins 64 and 66 are received in the apertures 74 in the vertical tubes 70 and 72 to secure the height of the horizontal tube 68 relative to the sleeves 60 and 62 and the chassis assembly 24. As such, the height of the portion of the tractor dolly assembly 20 that attaches to the vehicle frame 48 (FIGS. 7 and 8) can be adjusted to accommodate different vehicle frames.

As mentioned above, the tractor dolly assembly 20 is configured to attach directly to a vehicle frame 48. As best shown in FIGS. 7 and 8, the horizontal tube 68 (FIG. 6) portion of the T-bar assembly 58 is intended to rest directly on the vehicle frame 48. In applications where the vehicle has a fifth wheel assembly, for example, as illustrated in FIGS. 7 and 8, the horizontal tube 68 is normally seated between the fifth wheel assembly 51 and the vehicle cab 76. In order to account for differences in the frames of different vehicles, the length of the horizontal tube 68 (FIG. 6) portion of the T-bar assembly 58 is selected to accommodate such differences. More particularly, known vehicle frames, such as the vehicle frame 48 on a semi tractor include two spaced apart beams. The horizontal tube 68 portion of the T-bar assembly 58 is intended to rest on these spaced apart beams of the vehicle and disposed at generally a 90 degree angle in an x-y plane.

Because the spacing between the spaced apart beams forming the vehicle frame 48 varies from vehicle to vehicle, adjustable shoes 54 may be provided, as discussed above. The adjustable shoes 54 re formed as tube members have a cross section slightly larger the cross section of the horizontal tube 68 to enable the adjustable shoes 54 to be slidably received relative to the horizontal tube 68. The adjustable shoes 54 include an extending lip portion 80 which is intended to seat against the outside of the vehicle frame 48, as best shown in FIGS. 7 and 8. The adjustable shoes 54 may be secured in place by way, for example, a threaded aperture (not shown) formed in one wall of the adjustable shoe 54. A threaded fastener (not shown) is threaded into the aperture to secure the adjustable shoe 54 to the horizontal tube 68 of the T-bar assembly 58 to secure the adjustable shoes 54 in place with respect to the horizontal tube 68 by friction. Other means are also suitable.

The horizontal tube 68 is intended to be supported by the vehicle frame 48 and may extend outward therefrom. The length of the horizontal tube 68 may be selected so that the horizontal tube 68 rests on or extends outwardly from vehicle frames 48 having different widths. The slidably mounted shoes 54 are used to capture the vehicle frame 48 between the extending lips 80 of the shoes 54.

In operation, the horizontal tube 68 of the T-bar assembly 26 is positioned to rest on the vehicle frame 48. The slidably mounted shoes 54 are then juxtaposed so that the outer surfaces of the vehicle frame 48 are captured between the extending lips 80 of the shoes 54. In order to secure the shoes 54 to the horizontal tube 68, a number of apertures (not shown) are provided in the horizontal tube 68. An aperture (not shown) is provided in each of the shoes 54. Once the shoes 54 are positioned such that the extending lips 80 capture the outside surfaces of the vehicle frame, fasteners or a pin 82 is used to secure the position of the shoe 54 with respect to the horizontal tube. 68.

The wheeled cart assembly 28 includes a rectangular frame 82 is carried by two axles 84 and 86 (FIG. 3). A plurality of wheel assemblies 88, 90, 92 and 94 are rotatably coupled to the axles 84 and 86. As shown, the wheel assemblies 88, 90, 92 and 94 are connected directly to the axles 84 and 86 and offer no steering capability. Alternately, self steering axles could be provided for the axles 84 and 86, for example, as described in detail in U.S. Pat. Nos. 4,768,802 and 6,820,887, hereby incorporated by reference. In yet other contemplated embodiments, the wheel assemblies 88, 90, 92 and 94, may be configured, for example, as described in detail in US Patent No. 88, 90 and 92, 94 and may be interconnected by way of tie rods (not shown) so that the each pair of wheel assemblies 88, 90 and 92, 94 steer together 82 by way of a plurality of vertical arms 96, 98, 100 and 102; a plurality of swing arms 104, 106, 108 and 110 (FIG. 2) and a plurality of brackets 108, 110, 112 and 114 (FIGS. 8 and 9).

Figure 9:
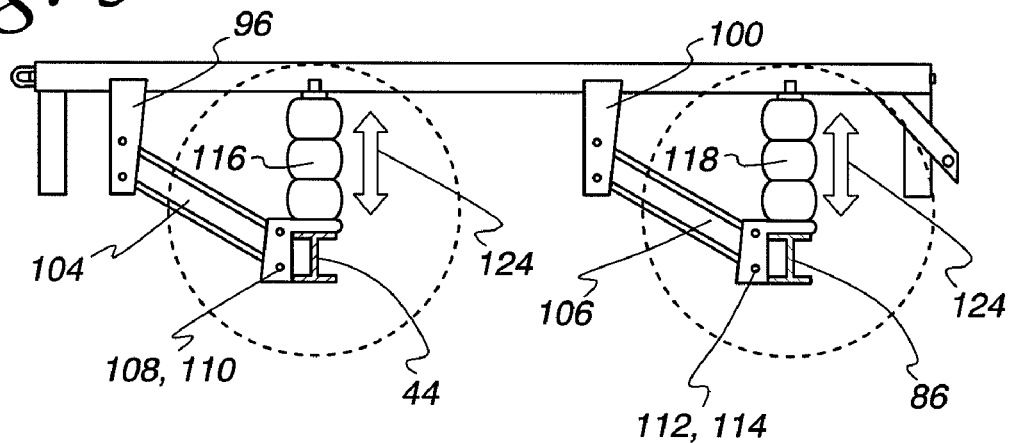
FIG. 9 is a partial side elevational view of the wheel assembly which forms a part of the tractor dolly assembly illustrated in FIG. 1, shown with the wheels removed, illustrating a set of air springs in an expanded position.

As best shown in FIGS. 8 and 9, the swing arms 104, 106, 108 and 110 are pivotally mounted to the vertical arms 96, 98, 100, 102. Lifting mechanisms, such as air springs 116, 118, 120 and 122 (FIGS. 6, 8 and 9), are securely disposed between the brackets 108, 110, 112 and 114 and the frame 82.

Figure 10:
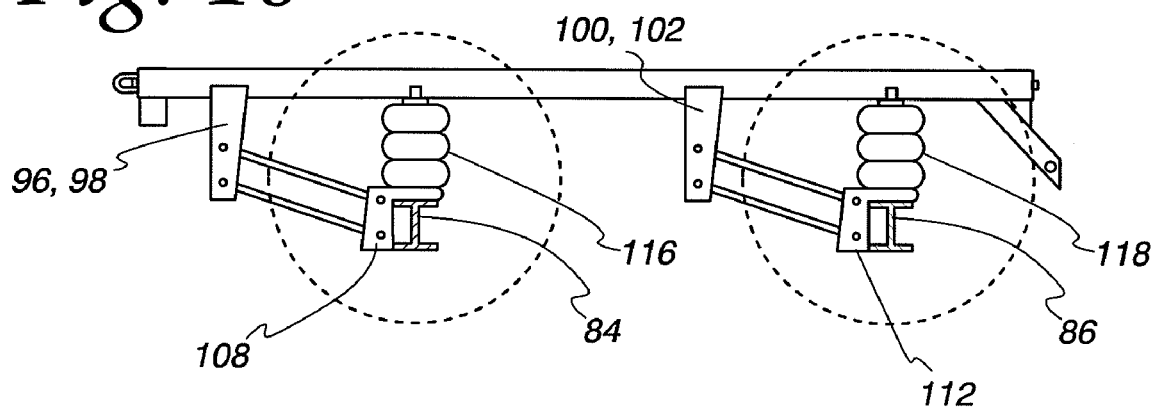
FIG. 10 is similar to FIG. 9 but with the air springs in a relaxed position.

FIG. 9 illustrates a relaxed position for the air springs 116, 118, 120 and 122, i.e., a condition in which the air springs 116, 118, 120 and 122 are subject to minimal air pressure. FIG. 10 illustrates an extended position for the air springs 116, 118, 120 and 122, i.e., a condition in which the air springs 116, 118, 120 and 122 have been pressurized by a source of external air pressure (not shown). These air springs 116, 118, 120 and 122 allow the height of the generally rectangular frame 82 (FIG. 6) to be varied with respect to the axles 84 and 86 (FIG. 3). More particularly, in a relaxed position as shown in FIG. 10, the distance between the axles 84 and 86 and the generally rectangular frame 82 is minimal. As shown in FIG. 9, when the air springs 116, 118, 120 and 122 are fully extended, as indicated by the arrow 124, the distance between the axles 84 and 86 and the generally rectangular frame 82 (FIG. 2) is increased. As such the air springs 116, 118, 120 and 122 serve as a lifting mechanism the tractor dolly assembly chassis assembly 42 relative to the axles 84 and 86 of the wheeled cart assembly 22. Once the tractor dolly assembly 20 is secured to the vehicle frame, lifting the chassis assembly 42 causes the rear portion of the vehicle to be towed, as illustrated in FIGS. 7 and 8.

The wheeled cart assembly 38 may also include a bumper 129 (FIG. 6). The bumper 129 may be attached to the frame 82 of the wheeled cart assembly 22. As shown, the bumper 129 may be fixedly attached to the frame 82 of the wheeled cart assembly 22 by way of a pair of spaced apart brackets 128 and 130. The bumper 129 may be used carry tail lights, generally indicated with the reference numeral 132, which can be used in the event the semi-trailer's tail lights and/or electrical system are damaged or are not operational. The bumper 129 can also be used to carry one or more electrical connectors that can be connected on one end to temporary lights (not shown).

As best shown in FIGS. 7 and 8, the chassis assembly 24 is secured to the frame 48 of the vehicle by way of straps or chains 134 and 136 to secure the chassis assembly 24 of the tractor dolly assembly 20 to the vehicle frame 48. Additional straps and chains 140 and 142 may be used to secure the towed vehicle's axles to the chassis assembly 24 to keep those axles in a raised position during the tow.

U-bolts, generally identified with the reference numeral 144 may be secured to the outer surfaces of the chassis assembly for receiving the straps and chains. Alternatively, slots may be formed in the chassis assembly for receiving the straps or chains.

Figure 11:
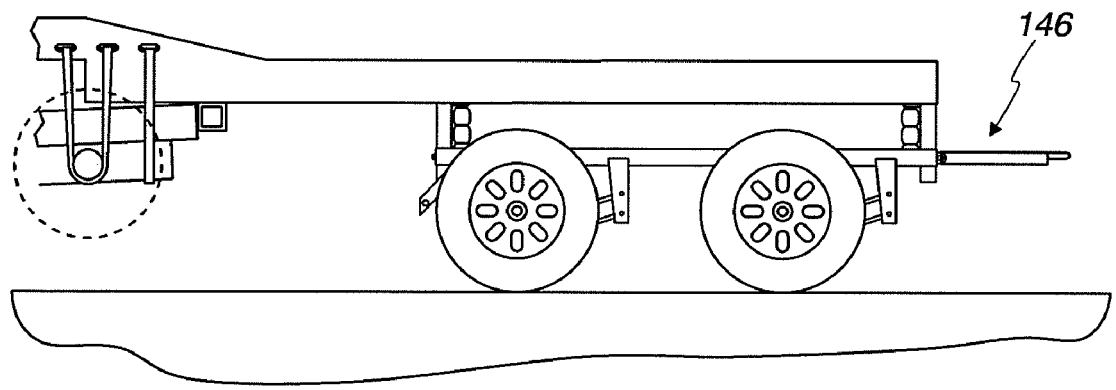
FIG. 11 is a partial elevational view illustrating an embodiment of the tractor dolly assembly with an optional draw or tow bar.

As shown in FIG. 11, the tractor dolly assembly 20 may include a draw or tow bar 146. The draw bar 146 may be incorporated on embodiments without a bumper 129 or may be located above the bumper 129. The draw bar 146 may be pivotally or removably mounted to the rear of the tractor dolly assembly 22 either to the chassis assembly 24 or the frame 82 (FIG. 6) of the wheeled cart assembly. A free end of the draw bar 146 may be configured for coupling to a conventional pintle hook or other means of a tow vehicle.

Obviously, many modifications and variations of the present invention are possible in light of the above teachings. Thus, it is to be understood that, within the scope of the appended claims, the invention may be practiced otherwise than as specifically described above.

I claim:

1. A tractor dolly assembly for use in towing a semi-tractor tractor having a cab, frame, front and rear wheels and a fifth wheel assembly, the tractor dolly assembly comprising:

a chassis assembly comprising a plurality of frame members forming a generally rectangular frame formed to bridge over said fifth wheel assembly and to be supported by an adjustable support on a front portion of a rear frame of a semi-tractor between the cab and the fifth wheel assembly; and a wheeled cart assembly coupled to said chassis assembly, said wheeled cart assembly including a frame and at least one axle for receiving a pair of wheels; said at least one axle mechanically coupled to said frame by way of a lifting mechanism for varying the distance between said at least one axle and said frame for selectively lifting the rear wheels of said semi-tractor off the ground during towing in a forward and reverse towing direction.

2. The tractor dolly assembly as recited in claim 1, wherein said wheeled cart assembly wherein said at least one axle is a self-steering axle.

3. The tractor dolly assembly as recited in claim 1, further including a draw bar mechanically coupled to a rear portion of the tractor dolly assembly to enable said vehicle to be towed in a reverse direction.

4. The tractor dolly assembly as recited in claim 1, wherein said chassis assembly is formed to accommodate vehicles having vehicle frames of different heights.

5. The tractor dolly assembly as recited in claim 1, wherein said stand off assembly includes shoes for capturing the frame of said semi-tractor.

6. The tractor dolly assembly as recited in claim 5, wherein said shoes are adjustable for engaging frames of semi-tractors having different widths.

7. The tractor dolly assembly as recited in claim 1, wherein said chassis assembly includes a bumper.

\* \* \* \* \*